June 7, 1927.  
E. H. AMET  
MOTION PICTURE SCREEN  
Filed Dec. 23, 1924  
1,631,240
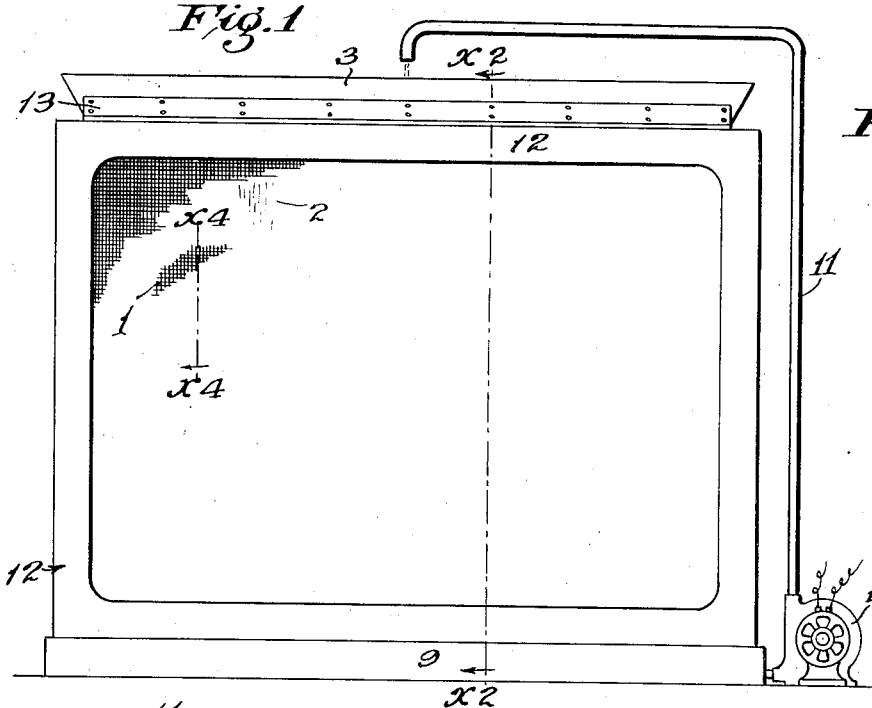
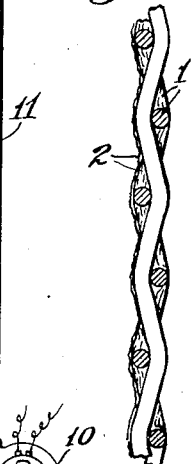
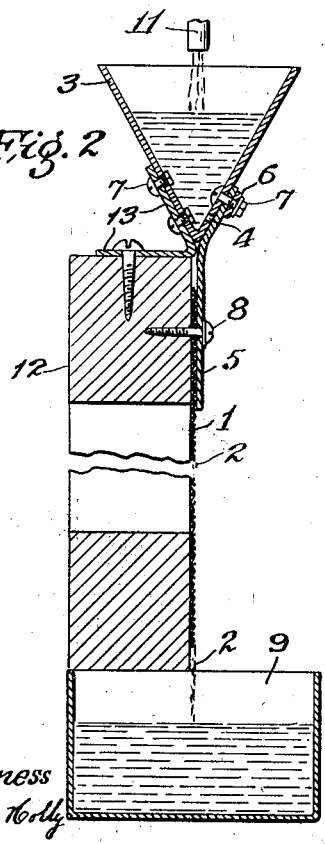
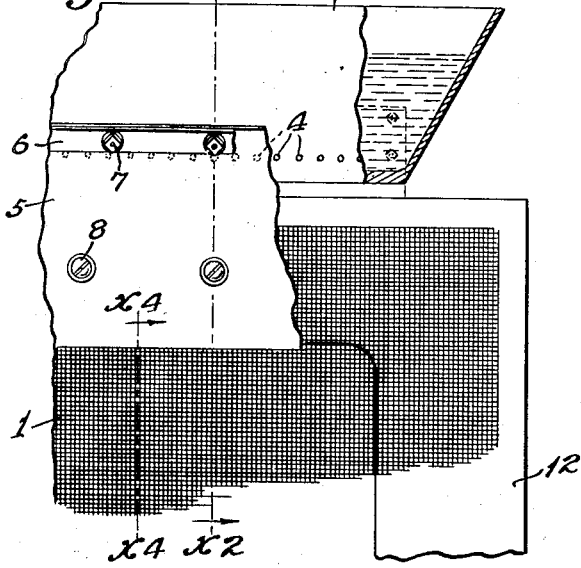
Inventor  
Edward H. Amet  
by James R. Townsend  
his atty
Witness  
C. C. Holly Patented June 7, 1927.

1,631,240

UNITED STATES PATENT OFFICE.

EDWARD H. AMET, OF REDONDO BEACH, CALIFORNIA.

MOTION-PICTURE SCREEN.

Application filed December 23, 1924. Serial No. 757,603.

An object of this invention and discovery is to provide an improvement over the reticulated motion picture curtain, patented to me July 1, 1919, No. 1,308,468.

An object of the invention is not only to eliminate back flash and to improve the reflected image, but also to increase the clear cut nature of the picture accepted by the eye of the beholder, and to increase the perspective, the stereoscopic and the atmospheric effects.

I have discovered that by closing the interstices of a closely reticulated sheet of light-absorbing material, such for instance as a sheet of black wire fly screen, with a translucent filling, or film, improved results in the respects stated, are secured.

Such translucent filling may be a film of water or other liquid flowing down the upright sheet in such quantity as to maintain a translucent interstitial filling for said screen without concealing the reticulations.

In my former patent small apertures were left in the interstitial filling, and from the space occupied by such passages or holes there was no return reflection owing to the necessity of providing a dark room or space behind the curtain.

An object of this invention is to eliminate the need of the dark room or space behind the screen, and to retain the advantages obtained by its use.

Another object is to allow practical projection to the eye of the beholder through the screen so as to lessen danger to the audience from fire in the projecting room.

I have discovered that by providing a screen with a multitude of light reflecting surfaces of small area, more or less separated from each other by light absorbing borders or frames, so that each portion of a picture falling upon any one framed area of the screen, will be surrounded as it were, by a light absorbing border, the aberrations projected on each framed portion are stopped or cut off at each of such border lines and that the reflected image on such a screen impresses the eye as clearer cut than when the projection is reflected from a screen free from such border lines.

I have also discovered that when the picture is projected through the translucent filling in the interstices of the screen to the eye of the beholder, the framing has a like effect of stopping the aberrations and the eye is impressed with a clearer image than when the framing is omitted.

In practice pictures will be projected onto the completed screen in the same way as with motion pictures of a common character heretofore well known except that preferably the projection of the picture may be from behind, and through the screen.

The results depend upon the light absorbing portions for the sub-division of picture-presenting surface into individual frames.

The translucent portions reflect the light and the absorbing portions prevent diffusion, and sharpen the picture as the diaphragm of a camera acts to sharpen the picture, viz by reducing the number of images which would otherwise produce a blurring effect.

An object of the screen is to really diaphragm from the picture and not from the lens, as too much light would be lost by diaphragming from the lens.

In my present invention the entire surface of the sheet may reflect the light, and finely separated different portions of the screen surface reflect the light in differing degrees, reaching a minimum at the raised dark borders.

This screen, under all the forms which I at present contemplate making it, is practically fire-proof, that is to say, it is nowise inflammable and its use either with the liquid or the solid filling affords a degree of protection to the audience from any fire in the operating room on the side of the screen opposite to the audience.

The filler for the net openings, when the fluid filler is employed in the form of a thin film flowing over the net, has an excellent reflecting surface and the picture may be projected upon the back of the screen and seen from the front, that is the side toward the audience.

The danger from accidental ignition of the film starting a stampede is greatly lessened as the screen acts as a fire curtain of certain resistance. A picture projected upon a screen of this construction has wider stereoscopic value and is almost entirely free from distortion, and may be viewed directly across the screen; the image retaining its natural proportions and depth.

Another object is to increase the reflecting area of the screen as compared with that of my former patent.

Certain advantages arise from breaking up the screen surface into small areas bordered by the light absorbing portions of the wires thus affording a degree of improvement over former picture screens when the picture is viewed from the side toward the projecting machine; even though the filling is more or less opaque and more or less colored.

Other objects, advantages and features of invention may appear from the accompanying drawing, the subjoined detailed description and the appended claims.

The accompanying drawing illustrates the invention.

Figure 1 is a view of one face of a motion picture screen with an assembly conforming to the principles of this invention, and provided with a flowing surface adapted for presenting the picture either by reflection or by varied transmission depending on whether the illumination is on the side toward or opposite the beholder.

In the drawing only a portion of the net and flowing bridging is indicated for the convenience of the draftsman, and for clearness of illustration; it being understood that the entire screen is supplied with net and interstitial bridging.

Fig. 2 is an enlarged fragmental section on line $x^2$, Fig. 1 of the screen, with the assembly shown in Fig. 1.

Fig. 3 is an enlarged fragmental view of the opposite side of the screen to that shown in Fig. 1.

Fig. 4 is a magnified section on line $x^4$, Figs. 1 and 3.

1 indicates the reticulated screen material, such for instance as common fly screen.

2 indicates the liquid translucent interstitial illuminatable bridging, closure, flowing filling or film, which is supplied from a trough 3 through perforations 4, to a distributor 5 that may be a strip of blanket secured to the trough by suitable means as a metal strip 6 and screws or brads 7 and by tacks 8 to the frame 12 to which the screen 1 is fixed. The water or other liquid is collected in the reservoir 9 and returned therefrom to the trough 3 by a pump 10 and pipe 11.

12 is the frame of the screen on which the trough 3 is supported by the standards 13.

I claim:

1. A picture screen comprising a net of proper mesh and color, the interstices of which are closed by a filler to form a film of predetermined color and translucency, the film acting as a reflecting surface of the screen when the light is projected onto the viewed side, and transmitting light when viewed from the other side; the net material dividing the reflecting surfaces and acting as diaphragms whereby the reflecting surfaces of the net are of lower value than the film and serving to produce stereoscopic effect in a picture projected upon the screen.

2. A picture screen comprising a net of suitable wire mesh, the openings in said net being covered by a continuous flow of liquid to form a film of predetermined color and translucency, the film acting as a reflecting surface when the light is projected onto the viewed side, and transmitting light when viewed from the other side; the wires of the net material remaining visible, substantially forming rectangular borders more or less broken at the angles, with a light absorbing surface between the borders so that reflecting surfaces of the net are of lower value than the film are provided and serving to produce stereoscopic effect in a picture projected upon the screen.

In testimony whereof, I have hereunto set my hand at Los Angeles, California, this 11th day of December, 1924.

EDWARD H. AMET.